United States Patent
Storz et al.

(10) Patent No.: US 7,873,241 B2
(45) Date of Patent: Jan. 18, 2011

(54) METHOD FOR SUPERIMPOSING OPTICAL INFORMATION IN A SCANNING MICROSCOPE

(75) Inventors: Rafael Storz, Heidelberg (DE); Volker Seyfried, Nussloch (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1425 days.

(21) Appl. No.: 11/236,143

(22) Filed: Sep. 27, 2005

(65) Prior Publication Data

US 2006/0066734 A1    Mar. 30, 2006

Related U.S. Application Data

(60) Provisional application No. 60/714,707, filed on Sep. 7, 2005.

(30) Foreign Application Priority Data

Sep. 28, 2004    (DE)    ......... 10 2004 047 519

(51) Int. Cl.
*G06K 9/32*    (2006.01)
*G09G 5/00*    (2006.01)
*H04N 1/04*    (2006.01)
*H04N 5/44*    (2006.01)
*H04N 9/74*    (2006.01)
*H04N 3/223*    (2006.01)
*G01B 11/26*    (2006.01)
*G01B 11/14*    (2006.01)
*G01C 17/00*    (2006.01)

(52) U.S. Cl. ......... 382/295; 345/615; 345/648; 345/672; 358/488; 356/138; 356/614; 702/150; 348/561; 348/580; 348/704

(58) Field of Classification Search ......... 382/276–302; 345/615, 619–689; 358/488; 356/138–614; 702/150; 348/561, 580–583, 704
See application file for complete search history.

(56) References Cited

U.S. PATENT DOCUMENTS

| | | | | |
|---|---|---|---|---|
| 5,452,375 A * | 9/1995 | Rousseau et al. | ............ | 382/302 |
| 6,081,577 A * | 6/2000 | Webber | ............ | 378/23 |
| 6,671,421 B1 * | 12/2003 | Ogata et al. | ............ | 382/284 |
| 6,788,210 B1 * | 9/2004 | Huang et al. | ............ | 340/612 |
| 6,792,370 B2 * | 9/2004 | Satoh et al. | ............ | 702/95 |
| 7,280,710 B1 * | 10/2007 | Castro-Pareja et al. | ............ | 382/303 |
| 2002/0025082 A1 * | 2/2002 | Kaushikkar et al. | ............ | 382/294 |
| 2004/0001645 A1 * | 1/2004 | Snyder | ............ | 382/276 |
| 2004/0022436 A1 * | 2/2004 | Patti et al. | ............ | 382/191 |
| 2004/0136582 A1 * | 7/2004 | Bacus et al. | ............ | 382/128 |
| 2005/0008256 A1 * | 1/2005 | Uchiyama et al. | ............ | 382/291 |

* cited by examiner

*Primary Examiner*—Anand Bhatnagar
*Assistant Examiner*—Randolph Chu

(57) ABSTRACT

A method for superimposing optical information in a scanning microscope includes determining a transformation matrix, and superimposing first optical information of a CCD image and second optical information of at least one piece of second image information using the transformation matrix.

15 Claims, 6 Drawing Sheets

Image A

=

T_zoom * T_rot * T_cm * Image B

*Image B*

*Image A*

*Image B*

$$= T\_zoom * T\_rot * T\_cm *$$

*Image A*

$T\_cm * Image\ B$ $= T\_zoom * T\_rot *$

Image A

*T_rot * T_cm * Image B*

= $T\_zoom$ *

*Image A*

$T\_zoom * T\_rot * T\_cm * Image\ B$

=

*Image A*

METHOD FOR SUPERIMPOSING OPTICAL INFORMATION IN A SCANNING MICROSCOPE

Priority is claimed to the provisional application entitled "Method for the Overlay of Optical Information in a Scan Microscope," filed on Sep. 7, 2005, by applicants, and to German patent application DE 10 2004 047 519.9, the entire subject matters of both of which are hereby incorporated by reference herein.

The invention relates to a method for superimposing optical information in a scanning microscope, at least one CCD image A being superimposed with at least one additional piece of image information B.

BACKGROUND

Methods for superimposing optical information in the realm of scanning microscopy are known from actual practice. In this process, CCD images are often superimposed with additional image information. In this context, the additional image information is often a scanned image. Through such a superimposition, additional information can be obtained about the specimen to be examined, said information going beyond the information that an individual CCD image and, for example, a scanned image can provide on their own. For example, potentials in individual calls can be depicted here. The normally colored CCD image can be superimposed with an image or with image information that supplies merely light-and-dark information. The superimposition of a CCD image with additional image information yields a higher resolution of the image depiction in comparison to individual images. Ultimately, the information obtained through a CCD image is increased by a superimposition with at least one additional piece of information.

With the prior-art methods for superimposing optical information, it is a common procedure to carry out a superimposition manually or by making complicated adjustments in order to achieve congruence of the superimposed optical information. This is extremely time-consuming, as a result of which the individual scanning microscopes do not achieve a high specimen throughput rate.

Particularly when a CCD image is superimposed with a scanned image, system-related differences and shifts in the images occur in terms of the position, rotation and size of the images that have to be compensated for by manual processing or complicated adjustments in order to achieve a congruence of the images.

SUMMARY OF THE INVENTION

Consequently, it is an objective of the present invention to provide a method for superimposing optical information of the type described above, in which a reliable superimposition of the optical information and a high specimen throughput rate are ensured.

The present invention provides a method for superimposing optical information in a scanning microscope, at least one CCD image A being superimposed with at least one additional piece of image information B. A transformation matrix T is determined that allows the superimposition of the optical information of the at least one CCD image A and of the at least one piece of image information B.

It has been recognized according to the invention that a superimposition of optical information in a scanning microscope does not necessarily have to be carried out manually or by making complicated adjustments. In another manner according to the invention, it has been recognized that a transformation matrix T can be determined that allows the superimposition of the optical information of the at least one CCD image A and of the at least one piece of image information B. This translates into a superimposition of image information that has been obtained in different ways. With the method according to the invention, first of all, a method is put forward that allows a reliable superimposition of the optical information by the operator without errors in the case of a manual superimposition. Secondly, due to the superimposition by means of the transformation matrix T, a much faster superimposition of the optical information can be carried out virtually automatically.

Consequently, the method according to the invention for superimposing optical information in a scanning microscope constitutes a method with which reliable superimposition of the optical information and a high specimen throughput rate are ensured.

In an embodiment, the at least one piece of image information B can comprise logical data or information. Such data or information can be superimposed with a CCD image in a simple manner.

Depending on the requirements, the at least one piece of image information B can be acquired via at least one logical channel. The number of channels is to be adapted to the application case in question.

In another application, the at least one piece of image information B could be a scanned image or a confocal scanned image. In the case of superimposition with a CCD image, the information obtained through the CCD image can be linked, so to speak, with the information acquired through the scanned image.

In an embodiment, the image information B could be transferred into the CCD image A by means of one or more matrix multiplications $A=T*B$. As an alternative to this, the CCD image A could be transferred into the image information B by means of one or more matrix multiplications $B=T*A$. The selection of the transfer direction between the image information B and the CCD image A should be adapted to the application case in question.

For example, when a CCD image is superimposed with a scanned image, different influencing variables have to be taken into account that initially stand in the way of a correct superimposition. Here, the images might differ in terms of their rotation. Moreover, the individual image mid-points might not match the other mid-point in each case. Furthermore, different imaging techniques might entail different magnifications of the individual images relative to each other. Finally, non-linear deviations due to imperfect galvanometer movements can occur with the scanning microscope.

In order to take into account the above-mentioned influencing variables, the transformation matrix T could be formed by the multiplication of individual matrices so that $T=T1*T2$ .... Here, each of the independent influencing variables can be expressed and compensated for by individual matrices $T1, T2, \ldots$.

In an embodiment, the individual matrices $T1, T2, \ldots$ could each take into account differences in the at least one CCD image A and in the at least one piece of image information B in terms of the rotation and/or of the image magnification and/or of the centering.

Moreover, at least one matrix $T1, T2, \ldots$ could take into account non-linear deviations due to imperfect galvanometer movements. Finally, any desired influencing variable could be taken into account by one of the matrices $T1, T2, \ldots$.

With an eye towards an especially simple computation of the transformation matrix T, the transformation matrix T could be computed by means of mathematical models based on a reference structure. In other words, the matrix could be computed by solving different mathematical models. A coordinate transfer could be performed during the computation.

As an alternative, the transformation matrix T could be computed by means of a correlation formation. Here, the at least one piece of image information B could be convolved within the scope of the computation that is performed by means of a correlation formation. The correlation formation could serve as a model for the transfer of information or data.

In an embodiment, at least one superimposition parameter could be indicated. Such a superimposition parameter could comprise, for example, rotating the optical information that is to be superimposed with respect to each other or it could comprise magnification factors or shifts.

In order to ensure the highest possible quality of the superimposition of the optical information, the scanning microscope arrangement could be adjusted taking into account the superimposition parameters. In this manner, depending on the desired superimposition of image information, an individual adjustment of the scanning microscope arrangement could be effectuated.

In an embodiment, the adjustment of the scanning microscope arrangement could comprise a rotation and/or a size adaptation and/or a shift and/or a centering. Other types of adjustment are likewise conceivable in this context.

Depending on the images to be superimposed, it might happen that a complete superimposition or overlapping of the images cannot be achieved. Here, an intersection area of the images to be superimposed and usually several areas are present that do not overlap or that cannot be superimposed. The resultant intersection area usually does not have the normally desired rectangular or square shape of an image. In order to prepare such a desired rectangular or square shape of the superimposed image, the optical information in non-overlapping or in non-superimposable areas of the at least one CCD image A and of the at least one additional piece of image information B can be augmented by so-called "zero" information. As a result of this, an image shape can be attained that is square or rectangular or that has any other desired shape.

In an alternative overlapping adaptation, either the at least one CCD image A or the at least one additional piece of image information B can be reduced in size in order to achieve a maximum overlapping. In other words, each CCD image A or image information B is reduced in size until it is completely covered by the image information B or by the CCD image A. In this case, the complete size and shape of the reduced CCD image A or of the reduced image information B could be used as the overlapping image surface.

The above-mentioned adjustment of the scanning microscope arrangement and/or the above-mentioned augmentation by so-called "zero" information and/or the above-mentioned size reduction of the at least one CCD image A or the at least one additional piece of image information B could be done conveniently online. In this manner, an extremely flexible method is provided for superimposing optical information in a scanning microscope.

It is fundamentally possible to work with several imaging channels within the scope of the method according to the invention. This relates to the CCD image A as well as to the imaging of the additional image information B. Furthermore, it would be possible to work with several imaging devices on one scanning microscope. The selection of the number of imaging channels and/or of the CCD imaging devices should be adapted to the application case in question or to the particular specimen to be examined.

With the method according to the invention, the CCD image A could be used as a reference image. The additional image information B, which could be generated by a channel of a confocal scanning device, can then be transferred into the CCD image A in that matrix multiplications T are performed, which take in account differences and influencing variables that can occur due to different imaging techniques. Here, an equation system can be set up that meets the condition $A=T*B$, wherein T is the product of individual matrices that take into account the independent influencing variables and differences.

BRIEF DESCRIPTION OF THE DRAWINGS

There are various possibilities to configure and refine the teaching of the present invention in an advantageous manner. For this purpose, on the one hand, reference is made to the subordinate claims and, on the other hand, to the explanation below of a preferred embodiment of the method according to the invention with reference to the drawing. In conjunction with the explanation of the preferred embodiment of the method according to the invention with reference to the drawing, preferred embodiments and refinements of the teaching will be explained in general. The drawings show the following:

DETAILED DESCRIPTION

Figure 1:
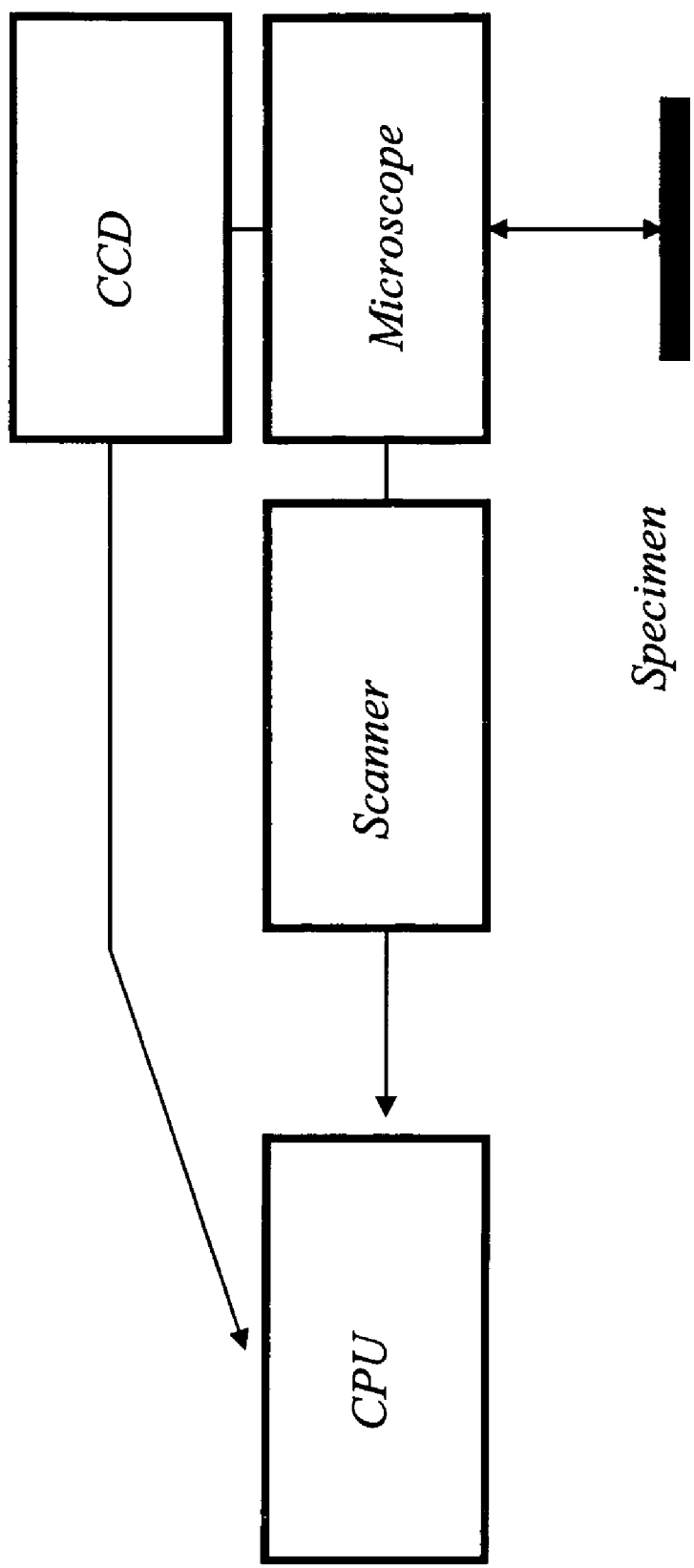
FIG. 1 a schematic depiction of a measuring arrangement for executing an embodiment of the method according to the invention, FIG. 2 a schematic depiction of a CCD image A with image information B that is to be superimposed, FIG. 3 a schematic depiction of the CCD image A and the image information B from FIG. 2, wherein the multiplication instructions to be performed by means of individual matrices T are depicted, FIG. 4 a schematic depiction of the CCD image A from FIG. 2 and the image information B that has already been multiplied by a matrix for centering the image, FIG. 5 a schematic depiction of the CCD image A from FIG. 2 and the image information B, wherein the image information B has been multiplied by a matrix in order to center the image and by a matrix for rotating the image, and FIG. 6 a schematic depiction of the CCD image A from FIG. 2 with the image information B that has additionally been multiplied by a matrix that serves to adapt the size.

FIG. 1 is a schematic depiction showing a measuring arrangement for executing an embodiment of the method according to the invention for superimposing optical information in a scanning microscope. Here, a CCD image A is superimposed with image information B that is formed by a scanned image generated by means of a scanner. The superimposition of the images of the specimen takes place in a central processing unit CPU. With an eye towards a reliable superimposition of the optical information and with an eye towards a high specimen throughput, in this method, a transformation matrix T is determined that allows the superimposition of the optical information of the CCD image A and the image information B.

Figure 2:
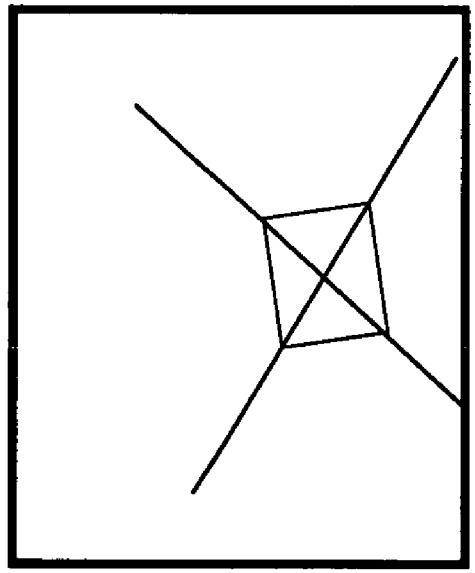
Figure 2:
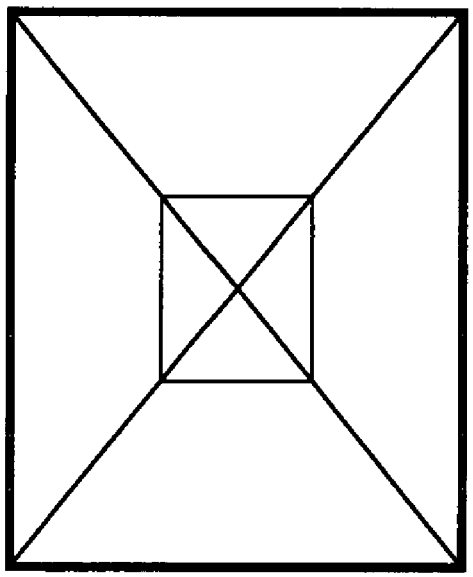

FIG. 2 is a schematic depiction showing a CCD image A as well as image information B that is to be superimposed.

Figure 3:
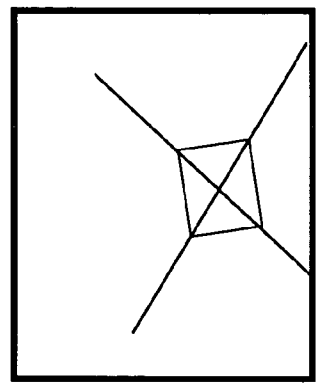
Figure 3:
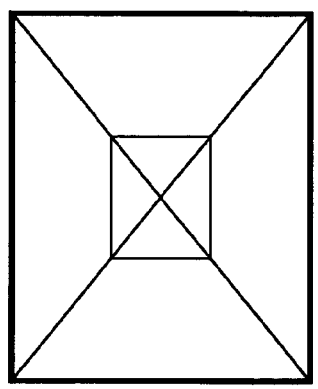

FIGS. 3 to 6 each show the CCD image A and the image information B; in FIG. 3, the total matrix multiplication that is to be performed by the individual matrices T is depicted schematically. The individual matrices T serve to adapt the magnification, the rotational position and the centering of the two images or image information A and B. Correspondingly, the individual matrices are represented by T_zoom, T_rot and T_cm. Here, "zoom" stands for a magnification or reduction, "rot" stands for rotation and "cm" stands for the centering in the sense of "center of mass". The transformation matrix T is formed by these individual matrices.

Figure 4:
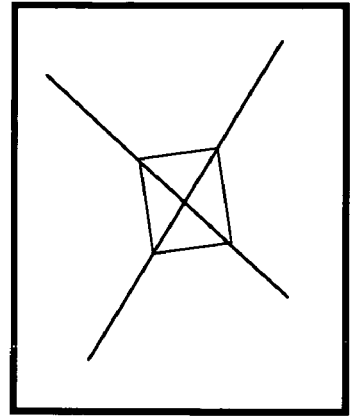
Figure 4:
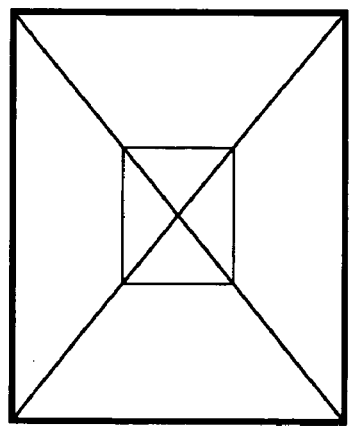
Figure 5:
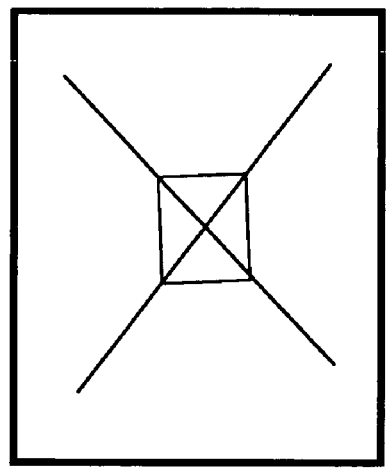
Figure 5:
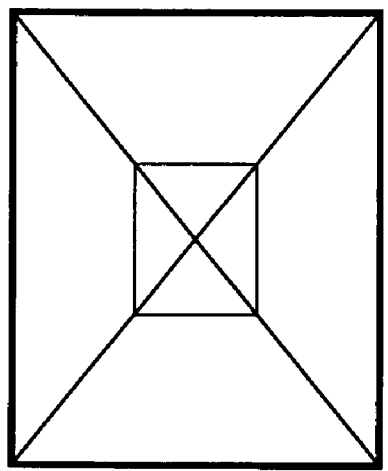
Figure 6:
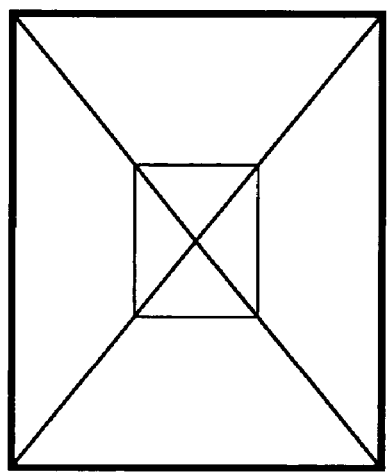
Figure 6:
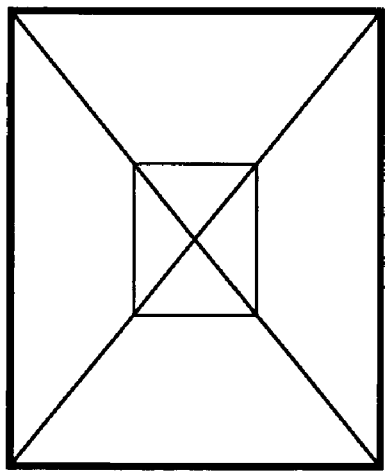

FIGS. 4 to 6 now successively show the progress of the superimposition by means of the multiplication of the image B by another individual matrix that is indicated below the image B in each case. Consequently, the image B in FIG. 4 is centered relative to the CCD image A through multiplication by the individual matrix T_cm. In FIG. 5, the image B is additionally adjusted to correspond with the CCD image A in terms of the rotational position or rotation, and for this purpose, the multiplication by the individual matrix T_rot is additionally indicated below the image B. In FIG. 6, the entire superimposition has now been achieved and here, another multiplication by the individual matrix T_zoom has additionally been performed. Accordingly, all of the individual matrices are indicated below the image B.

In addition, for example, another multiplication by an individual matrix T_nonlin could be performed, with which non-linear deviations due to imperfect galvanometer movements could be taken into account.

Regarding additional advantageous embodiments of the method according to the invention, in order to avoid repetitions, reference is hereby made to the general part of the description as well as to the accompanying patent claims.

Finally, it should be explicitly pointed out that the above-described embodiment of the method according to the invention serves merely to explain the claimed teaching, but this is not limited to the embodiment.

What is claimed is:

1. A method for superimposing optical information in a scanning microscope, comprising:
   acquiring a CCD image by scanning a specimen with a scanning microscope so as to provide a CCD image;
   acquiring at least one piece of second image information with the scanning microscope;
   determining a transformation matrix; and
   superimposing first optical information of the CCD image and second optical information of the at least one piece of second image information using the transformation matrix, and
   wherein, so as to take into account independent influencing variables, the determining the transformation matrix is performed by multiplication of a plurality of individual matrices $T = T1 * T2$ wherein T represents the transformation matrix and T1 and T2 respectively represent the individual matrices, and wherein at least one of the individual matrices T1 and T2 takes into account a non-linear deviation due to an imperfect galvanometer movement.

2. The method as recited in claim 1 wherein the at least one piece of second image information includes logical data or information.

3. The method as recited in claim 1 wherein the at least one piece of second image information is acquired via at least one logical channel.

4. The method as recited in claim 1 wherein the at least one piece of second image information includes a scanned image.

5. The method as recited in claim 1 wherein the at least one piece of second image information includes a confocal scanned image.

6. The method as recited in claim 1 wherein the superimposing is performed by transferring the at least one piece of second image information into the CCD image or by transferring the CCD image into the at least one piece of second image information using at least one of matrix multiplications $A = T*B$ and $B = T*A$ wherein A represents the CCD image, B represents the at least one piece of second image information, and T represents the transformation matrix.

7. The method as recited in claim 1 wherein the individual matrices T1 and T2 each take into account a respective at least one of rotation, magnification, and centering difference between the CCD image and the at least one piece of second image information.

8. The method as recited in claim 1 wherein the determining the transformation matrix is performed using at least one mathematical model based on a reference structure.

9. The method as recited in claim 8 wherein the determining the transformation matrix includes a coordinate transfer.

10. The method as recited in claim 1 wherein the determining the transformation matrix is performed using a correlation.

11. The method as recited in claim 10 wherein the using the correlation includes convolving the at least one piece of second image information.

12. The method as recited in claim 10 wherein the correlation serves as a model for a transfer of information or data.

13. The method as recited in claim 1 further comprising determining at least one superimposition parameter.

14. The method as recited in claim 1 further comprising augmenting at least one of the first and the second optical information in non-overlapping or in non-superimposable areas of the CCD image and the at least one piece of second image information using zero information.

15. The method as recited in claim 1 further comprising reducing in size at least one of the CCD image and the at least one piece of image information so as to achieve a maximum overlapping.

* * * * *